United States Patent

[11] 3,600,654

[72] Inventor Katsuya Yasutake
Yokohama, Japan

[21] Appl. No. 849,483
[22] Filed Aug. 12, 1969
[45] Patented Aug. 17, 1971

[73] Assignee Victor Company of Japan Limited
Kanagawa-ku, Yokohama, Japan

[54] MAGNETIC TAPE SPEED CONTROLLING SYSTEM
7 Claims, 16 Drawing Figs.

[52] U.S. Cl. .......... 318/6
[51] Int. Cl. .......... H01j 9/22
[50] Field of Search .......... 318/6

[56] References Cited
UNITED STATES PATENTS

| | | | |
|---|---|---|---|
| 2,627,592 | 2/1953 | Hutton et al. | 318/6 |
| 3,348,107 | 10/1967 | Hamby | 318/6 |
| 3,384,796 | 5/1968 | Shah | 318/6 X |
| 3,416,058 | 12/1968 | Hill et al. | 318/6 X |

*Primary Examiner*—Benjamin Dobeck
*Attorney*—Holman & Stern

ABSTRACT: A system for controlling the running speed of a magnetic tape. The running speed of a magnetic tape is always controlled within a determined value by increase of reverse rotational torque of a reel motor of a tape supplying reel and back tension of the tape when the running speed of the magnetic tape exceeds the determined value during fast forwarding or rewinding of the tape.

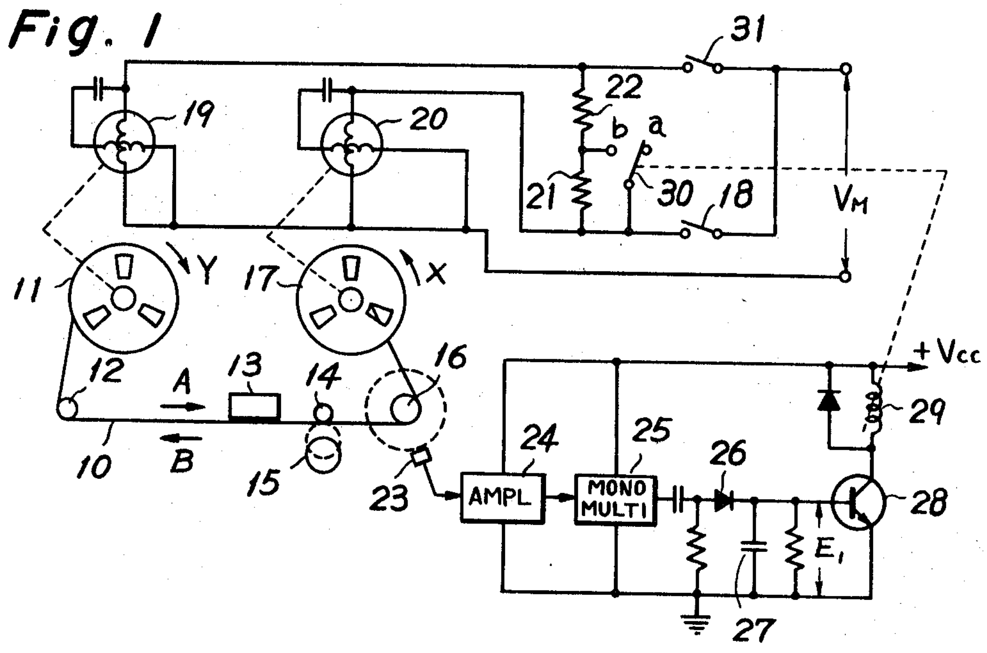
Fig. 2A, Fig. 2B, Fig. 2C, Fig. 2D
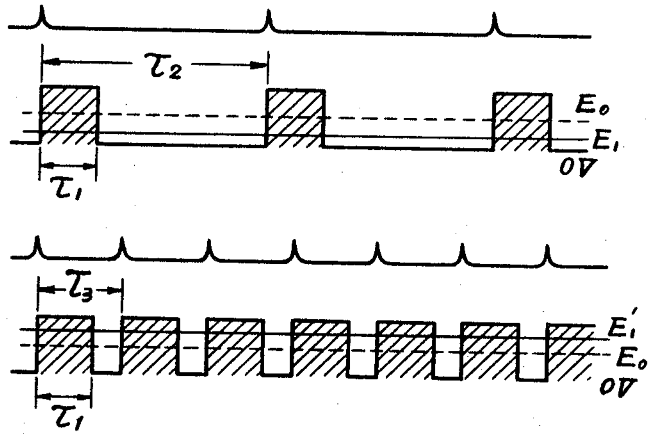
Fig. 3
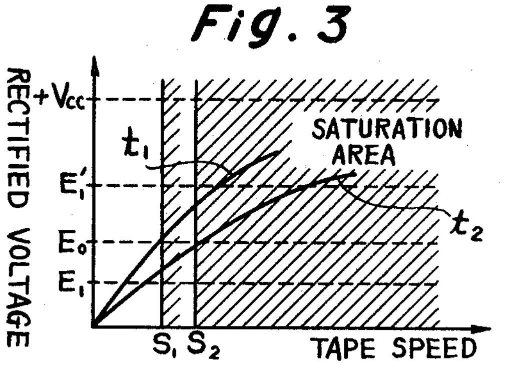
INVENTOR.
KATSUYA YASUTAKE
BY Holman, Glascock, Downing + Seebold
ATTORNEYS INVENTOR.
KATSUYA YASUTAKE
BY Holman, Glascock, Downing & Seebold
ATTORNEYS INVENTOR.
KATSUYA YASUTAKE
BY Holman, Glascock, Downing & Seebold
ATTORNEYS

MAGNETIC TAPE SPEED CONTROLLING SYSTEM

This invention relates to a magnetic tape speed controlling system and more particularly to a system for controlling the running speed of a magnetic tape within a determined value during fast forwarding or rewinding of the magnetic tape.

Generally, in the audio tape recorder, video tape recorder and the like magnetic recording and reproducing device, the running speed of a tape during its fast forwarding or rewinding is determined at 20 to 30 times the tape speed in ordinary recording and reproducing. Therefore the reproducing of the signal in such high speed running is not available because the frequency component deviates from a reproducible frequency band of the magnetic recording and reproducing device. Even though it is reproduced the reproduced signal when it is an audio signal will run out of an audible frequency range and is not recognized. And in case the reproduced signal is a video signal, the frequency of the horizontal synchronizing signal of the reproduced video signal becomes high and runs out of the followup range of the horizontal synchronizing oscillator of a receiver so that a well synchronized reproducing image picture cannot be obtained. In either case of fast forwarding or rewinding of a magnetic tape it was not able to recognize or know a location of a desired signal out of the recorded signals on the tape.

Thus it has been required to control the running speed of a tape during fast forwarding or rewinding not to exceed a determined speed value in order to obtain effectively a reproduced audio signal in the audio frequency range or a synchronized reproducing image picture.

The solution of this problem is therefore the general and essential object of this invention.

A primary object of the present invention is to provide a magnetic tape speed controlling system which is adapted to control the running of a tape by a simple construction so designed that the running speed of a magnetic tape in its fast forwarding or rewinding mode may not exceed the speed value as determined.

Other object of the invention is to provide a system for controlling the running speed of a tape such that the running speed of a magnetic tape may not exceed the value as determined for recognizing a location of a desired signal information recorded on the magnetic tape.

Still other object of the invention is to provide a system for controlling the running speed of a magnetic tape so that the position of a desired signal information among signals recorded on the magnetic tape can readily be recognized during fast forwarding or rewinding of the tape.

Further object of the invention is to provide a system for controlling the running speed of a magnetic tape by a proper control to the takeup speed of a takeup reel and the rotational speed of a supply reel imparting back tension to the tape to maintain the running speed of a magnetic tape in a determined range of speed.

Other objects and features of the present invention will be apparent from the description of the specification when read in conjunction with the accompanying drawings, in which:

FIG. 1 is a circuit diagram of an embodiment of the controlling system according to the invention;

FIGS. 2A to 2D are diagrams showing the relation between the pulse interval of a trigger pulse and a rectified voltage;

FIG. 3 is a diagram showing actuating and nonactuating areas of a transistor corresponding to the tape speed;

Figure 4:
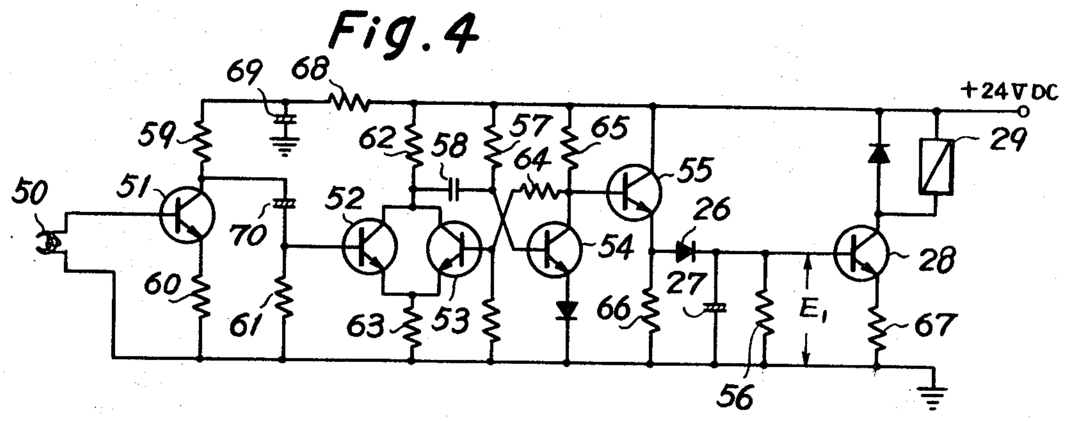
FIG. 4 is an embodiment of an electric circuit showing an essential part of the circuit diagram in FIG. 1.

In FIG. 1, a magnetic tape 10 in ordinary recording or reproducing time is supplied from a supply reel 11, guided by a guide pole 12, contacted with a magnetic head block 13 and held and driven by a capstan 14 and a pinch roller 15 which is compressed to the capstan. The magnetic tape is driven in the direction of an arrow A contacting a guide roller 16 and wound on a takeup reel 17.

Now is described the tape fast forwarding mode for forwarding the tape 10 with high speed from the supply reel 11 to the takeup reel 17.

Cooperating with a tape fast forwarding mode switch (not shown) the pinch roller 15 is detached from the capstan 14 and simultaneously a switch 18 is closed. As the switch 18 is closed, a reel motor 20 of the takeup reel 17 is applied a voltage $V_M$ (for example 100 v. AC) directly from a motor drive power source through the switch 18 so that the reel 17 is turned around positively in the direction of an arrow X or counterclockwise to wind the tape 10. The reel motor 19 for turning the supply reel 11 is applied the voltage dropped through resistances 21 and 22 in series connection. Thus the reel motor 19 imparts rotation to the reel 11 with lesser torque than in the reel motor 20 in the direction of the arrow Y or clockwise and a proper back tension is provided in the tape 10 supplied from the reel 11 to run fast in the direction of an arrow A and wound on the reel 17.

By running of the tape 10 the guide roller 16 contacting therewith rotates at a speed proportional to the running speed of the tape 10. There is taken up a trigger pulse which has a frequency proportional to the rotational speed of the roller 16 from a trigger pulse generator 23 later described and fed to an amplifier 24. The trigger pulse from the trigger pulse generator 23 of a pulse interval $\tau_2$ as shown in FIG. 2A is amplified by the amplifier 24 and waveformed, thereafter triggers a monostable multivibrator 25. Output signal of the multivibrator 25 which is a square wave of a pulse interval $\tau_2$ and a pulse width $\tau_1$ as shown in FIG. 2B is rectified in the rectifying circuit of a diode 26 and a capacitor 27. A rectified voltage $E_1$ proportional to the pulse interval $\tau_2$ is applied on the base of a transistor 28 as a base voltage. This rectified voltage $E_1$ is a mean value of positive side of output square wave signal of the multivibrator 25.

As taking up for fast forwarding of a tape on the reel 17 is started by reel motor 20 and running speed of the tape 10 in the direction of the arrow A increases gradually, the rotational speed of the guide roller 16 increases and consequently rises repeated frequencies of output signal of the monostable multivibrator 25. As the interval of the pulse from the pulse generator 23 turns small as $\tau_3$ as shown in FIG. 2C while pulse width $\tau_1$ of output signal of the multivibrator 25 is constant, the rectified voltage becomes $E'_1$ ($>E_1$) as shown in FIG. 2D. When this rectified voltage $E_1$ or the forward voltage between base and emitter of the transistor 28 exceeds a determined voltage $E_0$ corresponding to the determined running speed of the tape, the transistor 28 is saturated and made conducting and a relay 29 is actuated. As shown in FIG. 3, if the performance characteristics $t_1$ of the transistor 28 are preferentially set so that a voltage corresponding to the determined tape speed $S_1$ will become $E_0$, the characteristic curve will, corresponding to the characteristics $t_1$, enter the area of saturation of the transistor shown oblique lines rightward from a longitudinal line corresponding to the speed $S_1$ when the rectified voltage rises above the voltage $E_0$, so that the transistor is made conducting and the relay 29 is actuated. If the determined speed be given as $S_2$ the performance characteristics of the transistor 28 also may be preferred as in the case of characteristics $t_2$. When the relay 29 actuates the switch 30 is connected to a contact *b* side connected to between the resistances 21 and 22 from an open contact *a* side and the resistance 21 being short-circuited through said switch 30. After the resistance 21 is short-circuited the current flowing through the reel motor 19 increases and the torque in the direction of the arrow Y of the reel motor 19 increases, consequently the back tension of the tape 10 to the running direction of the tape increases whereas the running speed of the tape 10 decreases.

According to the increasing of the back tension by the reel motor 19, as the running speed of the tape is lowered below a determined value shown by $S_1$ or $S_2$, the rectified voltage is dropped lower than the predetermined voltage $E_0$ and the transistor 28 is cut off and made nonconducting. In the cutoff state of the transistor 28 the relay 29 is not actuating and the switch 30 is connected to the open contact *a*. Then the torque of the reel motor 19 is decreased and again the running speed of the tape 10 rises up. Therefore if the determined tape speed $S_1$, $S_2$, etc. be set at a speed reproducible the audio signals, video signals and the likes to be recognizable, the running speed of the tape 10 will be controlled such that it will not exceed the determined speed $S_1$ or $S_2$ by repetition of the above-described procedure. Said determined speed $S_1$, $S_2$, etc. can be selected by preference of a time constant $\tau_1$ of the monostable multivibrator 25.

Description is now made on the tape rewinding mode of rewinding the magnetic tape 10 from the takeup reel 17 to the supply reel 11.

In the operation of rewinding of a tape the switch 18 is opened and the switch 31 is closed. If the switch 31 is closed, the reel motor 19 is applied a voltage $V_M$ directly from the motor drive power source through the switch 31. The reel 11 positively rotates in the direction of the arrow Y and rewinds the tape 10. The reel motor 20 is added a voltage being dropped through the resistances 22 and 21. The reel 17 is imparted a rotational force in the direction of the arrow X with a torque less than that of the reel motor 19, thus a proper back tension is applied on the tape 10 which has been rewound to be supplied from the reel 17 and taken up to the reel 11. When the rewinding of the tape 10 is initiated and the tape running speed is larger than the determined value as $S_1$, $S_2$, etc., the controlling of the tape speed is performed in the quite similar manner as in the above described fast forwarding of tape.

Figure 5:
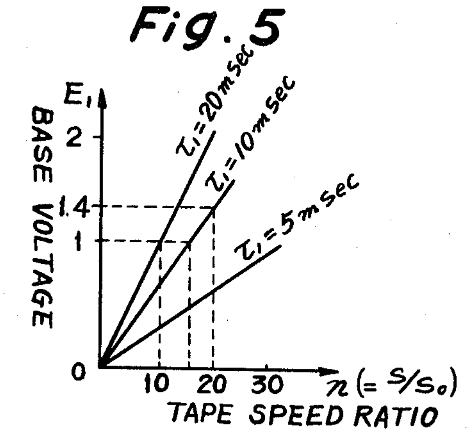
FIG. 5 is a diagram showing the relation between the tape speed and the base voltage of a transistor.

FIG. 4 shows an embodiment of an electrical circuit for actuating the relay 29 to operate the switch 30 in the circuit shown in FIG. 1. In the embodiment the pulse of an interval inversely proportional to the rotational speed of the guide roller 16 as detected by a detecting head 50 is amplified by transistors 51 and 52 and thereafter triggers a monostable multivibrator including transistors 53 and 54. The output pulse of said multivibrator is transformed in impedance by a transistor 55, passing through the diode 26, and held by the capacitor 27 and discharged as a current passing a resistance 56 and the base current of the transistor 28. As described the pulse interval $\tau_2$ of the output trigger pulse of the detecting head 50 is inversely proportional to the tape speed while the width $\tau_1$ of the output pulse of the monostable multivibrator is determined by a time constant of a resistor 57 and a capacitor 58 of the multivibrator so that the holding voltage of the capacitor 27 or the voltage $E_1$ between base and emitter of the transistor 28 is proportional to the tape speed as shown in FIG. 5.

In this embodiment, the pulse width $\tau_1$ is provided for 10 msec. and the tape feeding speed $S_0$ for 19.05 cm./sec. in ordinary recording and reproducing time. FIG. 5 shows a relation between the base voltage $E_1$ of the transistor 28 and the ratio $n(=S/S)$ of said tape speed $S_0$ and the tape speed $S$ at a preferred time of fast forwarding or rewinding, with the parameters of the pulse width $\tau_1$, where $\tau_1$=5 msec., 10 msec., and 20 msec.

The resistance values of the resistors 56, 57, and 59 to 68 and the capacitance values of the capacitors 27, 58, 69, and 70 are as follows.

| | | |
|---|---|---|
| Resistor: | 56 | 10KΩ |
| | 57 | 22KΩ |
| | 59 | 22KΩ |
| | 60 | 680 Ω |
| | 61 | 10KΩ |
| | 62 | 6.8KΩ |
| | 63 | 120Ω |
| | 64 | 33KΩ |
| | 65 | 6.8KΩ |
| | 66 | 3.3KΩ |
| | 67 | 47Ω |
| | 68 | 3.3KΩ |
| Capacitor: | 27 | 50μf. |
| | 58 | 0.1f. |
| | 69 | 100μf. |
| | 70 | 10μf. |

Figure 6:
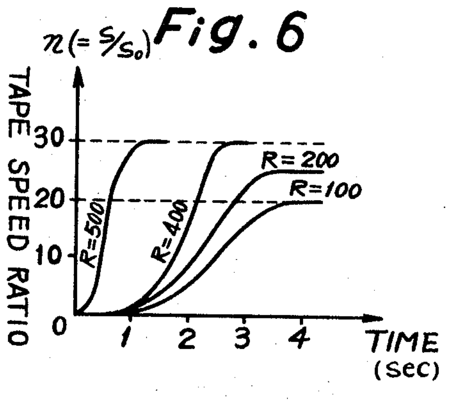
FIGS. 6 and 7 are diagrams showing the relation, with parameters of resistance values, between the elapsing time after closing of a switch and the ratio of tape speeds.

FIG. 6 shows the relation of elapsing time T (sec.) after closing of switch 18 (or 31) with the tape speed ratio $n(S/S_0)$, with the total resistance values $R$ of $R_1$ and $R_2$ of the resistances 21 and 22 as parameters, where $R$=100,200,400, and 500Ω. From this figure it will be seen that the tape speed ratio $n$ for the elapsing time T after closing of the switch 18 (or 31) is controlled by the total resistance values $R$ of the resistances 21 and 22.

Figure 7:
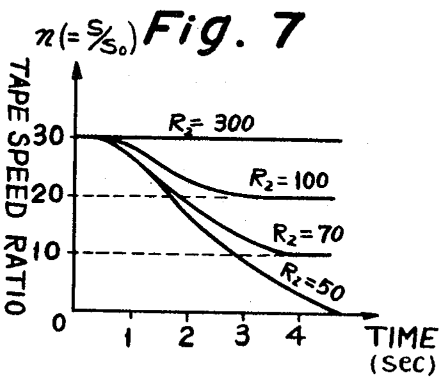

Variation of the tape speed ratio $n$ relative to the elapsing time T (sec.) is shown in FIG. 7, in which after the tape speed becomes to be a steady fast forwarding or rewinding speed, the tape back tension is varied with total resistance value $R$ being constant and with the resistance value $R_1$ being varied. This figure shows the variations of the tape speed ratio $n$, with the resistance value $R_2$ of the resistance 22 as a parameter, where $R_2$=50,70,100,300Ω, in case that the switch 30 is changed over from the contact *a* to the contact *b* and the resistance 21 is short-circuited, after the tape speed becomes to be a steady speed in case $R(=R_1+R_2)$=400Ω. In this embodiment, it is provided for that $R=R_1+R_2$=400Ω, $R_2$=70Ω, $S_0$= 19.05 cm./sec., $\tau_1$=10 msec., the minimum operating current of the relay 29 $I_S$=30 ma., and the maximum return current of the relay 29 $I_R$=15 ma.

Figures 8A, 8B, 8C:
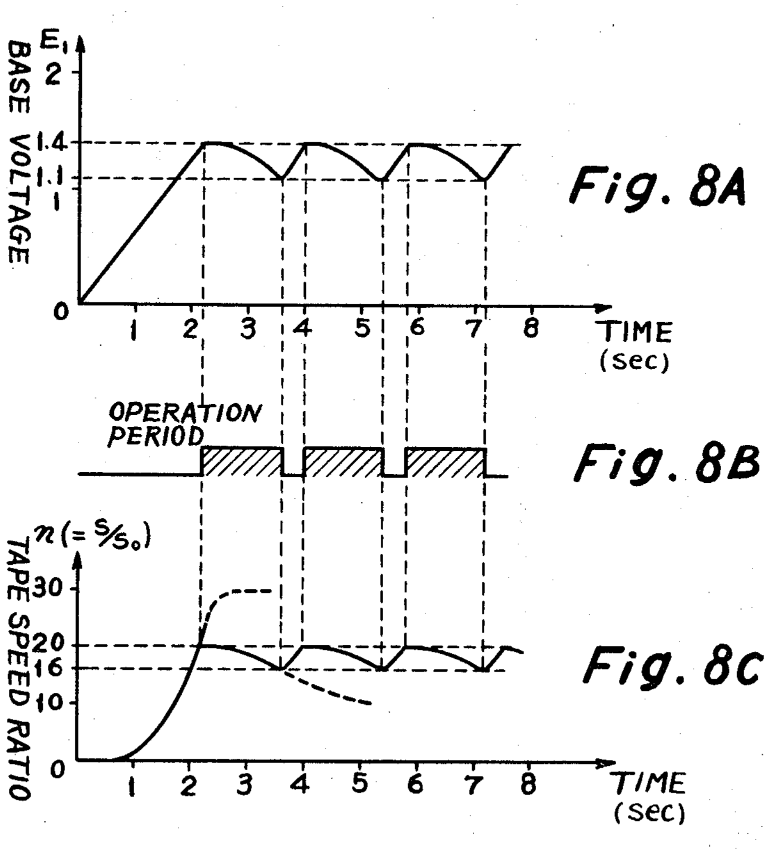
FIG. 8A is a diagram showing a variation of a transistor base voltage relative to the elapsing time.
FIG. 8B is a diagram showing an operating period of a relay.
FIG. 8C is a diagram showing a variation of the ratio of tape speeds relative to the elapsing time.

When the switch 18 of FIG. 1 is closed, the tape 10 increases its speed along a curve as of $R$=400Ω as shown in FIG. 6 to the point of $n$=20 as shown in FIG. 8C. As seen in FIG. 8A the base voltage $E_1$ of the transistor 28 rises along a straight line as in $\tau_1$=10 msec. as shown in FIG. 5. When it reaches $E_1$= 1.4 v. the relay 29 is actuated and thereby the switch 30 is changed over to the contact *b* and the resistor 21 is short-circuited. Accordingly, the tape speed decreases along the curve in case of $R_2$=70Ω as shown in FIG. 7 and the voltage $E_1$ drops from 1.4 v. to 1.1 v. as shown in FIG. 8A. At a moment when the voltage $E_1$ turns to 1.1 v. the relay 29 is returned being interrupted, the short circuiting of the resistor 21 is released and the tape speed rises again. FIG. 8B shows an operation period of the relay 29. At this moment the tape speed ratio $n$ drops to a point of $n$=16 as shown in FIG. 8C and then rises again. Consequently the variation of the speed ratio $n$ is always maintained between numerals 16 and 20. If it is set as in $\tau_1$=20 msec. the ratio $n$ will lie between numerals 11 and 14 and the maximum tape speed may be determined preferably by the value of $\tau_1$.

Figure 9:
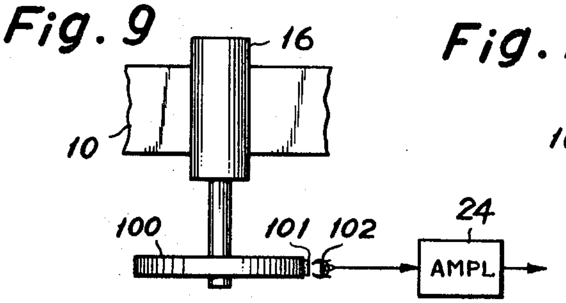
FIGS. 9 to 11 show respectively embodiments of pulse generators.
Figure 10:
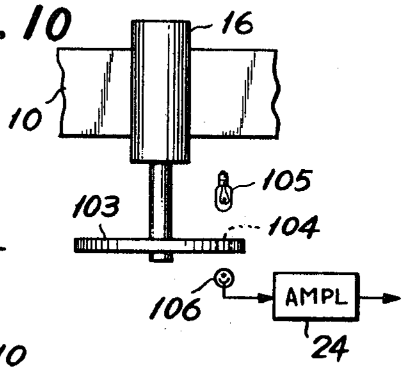
Figure 11:
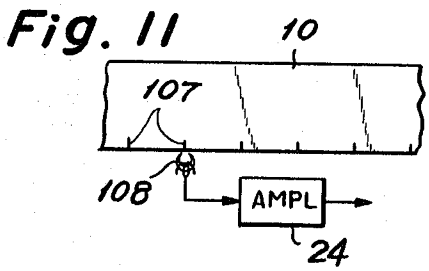

FIGS. 9 to 11 respectively show the embodiments of the pulse generator 23. FIG. 9 is a first embodiment which shows that a pulse is taken from a magnetic head 102 in response to the rotation of a magnetic pole piece 101 fixed on a peripheral surface of a wheel 100 at the lower end of a rotary shaft of the guide roller 16. FIG. 10 shows a second embodiment in which an aperture 104 on a disk 103 at the lower end of a rotary shaft of the guide roller 16 reaches in rotation to a line connecting a lamp 105 with a photoelectric transformer element 106 and the latter takes up the pulse. FIG. 11 is a third embodiment showing that a pulse signal 107 recorded at equal intervals on the edge of the tape 10 is detected by a detecting head 108 and thereafter the pulse is taken out.

While the invention has been described with respect to the specific and preferable embodiment, various modifications and variations thereof will be apparent to those skilled in the art without departing from the scope of which is set forth in the appended claims.

I claim:

1. A magnetic tape speed controlling system comprising two reel motors respectively transmitting rotational torques in opposite directions of one another to two reels for taking up and supplying a magnetic tape, first switch means for applying a first predetermined voltage to one of said two reel motors and a second predetermined voltage to the other of said two reel motors, said second predetermined voltage being lower than said first predetermined voltage so that the rotational torque to one of said two reels is larger than to the other of said two reels, generator means for generating a signal having a level which is proportional to the running speed of the magnetic tape, second switch means responsive to said signal when the level thereof exceeds a predetermined value for applying a third predetermined voltage to the other of said two reel motors, said third predetermined voltage being lower than said first predetermined voltage and higher than said second predetermined voltage so that the running speed of the magnetic tape is controlled within a predetermined range.

2. The magnetic tape speed controlling system as claimed in claim 1 wherein said generator means includes means for generating a first signal having repeating frequencies proportional to the running speed of the magnetic tape, and means responsive to said first signal for generating a second signal, the level of which is proportional to said repeating frequencies, and wherein said second switch means applies said third predetermined voltage to the other of said two reel motors in response to the second signal when the level of which exceeds a predetermined value.

3. The magnetic tape speed controlling system as claimed in claim 1 wherein said generator means includes means for generating a pulse signal having a repeating frequency proportional to the running speed of the magnetic tape, monostable multivibrator means responsive to said pulse signal for producing a square wave pulse signal synchronizing with said pulse signal and having a determined pulse width, and circuit means responsive to said square wave pulse signal for generating a signal having a signal level corresponding to the mean value of said square wave pulse signal, and wherein said second switch means applies said third predetermined voltage to the other of said two reel motors in response to the generated signal by said circuit means when the level of which exceeds a predetermined value.

4. The magnetic tape speed controlling system as claimed in claim 3, wherein said first switch means includes changeover switch means which are serially connected to the respective reel motors and operable to switch responding to respective fast forwarding and rewinding mode of magnetic tape, serially connected resistors opposite ends of which are respectively connected between connections of said respective changeover switch means and said respective reel motor, and means for applying said first predetermined voltage to said changeover switch means.

5. The magnetic tape speed controlling system as claimed in claim 4 wherein said second switch means further includes transistor means being made conducting or nonconducting in response to said signal generated by said circuit means in dependence on the level of said signal being respectively higher or lower than said predetermined value, relay means actuating during the period of conductance of said transistor means, and a switch actuated by said relay means for opening and short circuiting a part of said serially connected resistors to apply the third predetermined voltage to the other of said two reel motors.

6. A magnetic tape speed controlling system comprising two reel motors transmitting rotational torque respectively to two reels for taking up and supplying a magnetic tape, means for generating a voltage in response to the running speed of the magnetic tape, switching means responsive to the output voltage of said voltage generating means and including a resistance circuit for controlling the rotational torque of the reel motor of the reel supplying said magnetic tape corresponding to a running direction of the magnetic tape by switching and controlling the voltage applied thereto, and means increasing the rotational torque in a direction reverse to the rotational direction of the reel for supplying the magnetic tape when the magnetic tape speed exceeds a predetermined value of the tape speed, wherein said switching means comprises a transistor which is made respectively conducting or nonconducting in response to the output voltage of said voltage generating means, a relay means actuating during the period of conductance of said relay means to open and short circuit the resistance circuit.

7. A magnetic tape speed controlling system comprising two reel motors transmitting rotational torque respectively to two reels for taking up and supplying a magnetic tape, means for generating a voltage in response to the running speed of the magnetic tape, switching means responsive to the output voltage of said voltage generating means for controlling the rotational torque of the reel motor of the reel supplying said magnetic tape corresponding to a running direction of the magnetic tape by switching and controlling the voltage applied thereto, increasing the rotational torque in a direction reverse to the rotational direction of the reel for supplying the magnetic tape when the magnetic tape speed exceeds a predetermined value of the tape speed, wherein said switching means for controlling the rotational torque comprises a changeover switch which is serially connected to said respective reel motors and operable to change over responding to a fast forwarding and rewinding mode of the magnetic tape, and resistors connected in series between connections of said respective switch and said respective reel, said switching means being connected in parallel with a resistor of said serial resistors to open and short circuit said resistor by its opening and closing.